United States Patent [19]
Ohashi et al.

[11] Patent Number: 5,343,370
[45] Date of Patent: Aug. 30, 1994

[54] MOTOR VEHICLE HEADLAMP

[75] Inventors: Hideki Ohashi; Hisayoshi Murai; Hiroyuki Makita, all of Shizuoka, Japan

[73] Assignee: Koito Manufacturing Co., Ltd., Tokyo, Japan

[21] Appl. No.: 779,278

[22] Filed: Oct. 18, 1991

[30] Foreign Application Priority Data

| Oct. 23, 1990 | [JP] | Japan | 2-283551 |
| Mar. 20, 1991 | [JP] | Japan | 3-056762 |
| Mar. 20, 1991 | [JP] | Japan | 3-056763 |
| Mar. 20, 1991 | [JP] | Japan | 3-056764 |

[51] Int. Cl.$^5$ .............................. B60Q 1/04
[52] U.S. Cl. ............................ 362/61; 362/263; 362/265
[58] Field of Search ............ 362/61, 80, 221, 263, 362/265

[56] References Cited

U.S. PATENT DOCUMENTS

| 4,507,712 | 3/1985 | Dolan et al. | 362/80 |
| 4,517,629 | 5/1985 | Alexander et al. | 362/267 |
| 4,714,986 | 12/1987 | Wurster | 362/263 |
| 4,772,989 | 9/1988 | Haraden | 362/80 |
| 4,920,459 | 4/1990 | Rothwell, Jr. et al. | 362/263 |
| 4,942,503 | 7/1990 | Lysons | 362/263 |
| 5,107,405 | 4/1992 | Makita | 362/61 |
| 5,113,330 | 5/1992 | Makita | 362/61 |
| 5,124,895 | 6/1992 | Segoshi et al. | 362/61 |
| 5,132,881 | 7/1992 | Wakimizu et al. | 362/61 |

FOREIGN PATENT DOCUMENTS

| 607409 | 9/1962 | Fed. Rep. of Germany . |
| 2243208 | 4/1991 | United Kingdom . |

*Primary Examiner*—Ira S. Lazarus
*Assistant Examiner*—Y. Quach
*Attorney, Agent, or Firm*—Sughrue, Mion, Zinn, Macpeak & Seas

[57] ABSTRACT

A motor vehicle headlamp in which electromagnetic waves generated when the discharge bulb employed therein as the light source is activated are prevented from leaking out of the headlamp and interfering with other circuitry on the vehicle. The lamp body of the headlamp is made of a conductive material, or an insulating resin coated with a conductive layer. The lamp body or conductive layer is grounded to the body of the vehicle, thereby to ground out potentially interfering electromagnetic waves generated inside the lamp body.

9 Claims, 7 Drawing Sheets

MOTOR VEHICLE HEADLAMP

BACKGROUND OF THE INVENTION

The present invention relates to a motor vehicle headlamp employing a discharge bulb as its light source.

In the motor vehicle lamp industry, recently development efforts have been directed to a discharge lamp having an excellent light emission efficiency and color rendering characteristics, as well as a long service life. To achieve this, extensive research has been carried out on the use of a discharge lamp for the light source of a motor vehicle headlamp. However, the use of a discharge bulb suffers from a problem in that, in order to start the discharge bulb, it is necessary to provide a lighting circuit for applying high voltage across the two confronting electrodes of the discharge bulb. Moreover, the discharge lamp or lighting tube produces electromagnetic noise when activated, which can adversely affect nearby electrical circuits.

More particularly, in the operation of a discharge bulb, a metal halide bulb, for instance, typically produces electromagnetic waves in a frequency band 30 to 400 MHz. On the other hand, in order to start the discharge bulb, it is necessary to provide a lighting circuit for applying high voltage between the pair of electrodes employed in the discharge bulb. When the lighting tube in the lighting circuit is activated, electromagnetic waves are generated. Because of those electromagnetic waves, radio interference takes place. For instance, interference may be caused with the car radio or an on-board computer.

SUMMARY OF THE INVENTION

In view of the foregoing, an object of the invention is to provide a motor vehicle headlamp employing a discharge bulb as its light source in which, when the discharge lamp or the lighting tube is activated, electromagnetic noise produced thereby is prevented from leaking out of the headlamp.

In order to achieve the above and other objects, in a motor vehicle headlamp employing a discharge lamp as its light source, a discharge bulb lighting circuit is provided in a lamp body, which is electrically conductive. The term "electrically conductive" as used in this context is intended to mean that the lamp body is made of an electrically conductive material, or it is made of an electrically nonconductive material with an electrically conductive layer formed thereon. That is, in accordance with the invention, the lamp body has an electrically conducting function, and the electrically conducting part of the lamp body is grounded.

Further in order to achieve the above and other objects of the invention, in a motor vehicle headlamp employing a discharge bulb as a light source, a lighting circuit for the discharge bulb is provided inside a lamp body, and an electrically conductive layer is formed on the outer surface of the lamp body, which conductive layer is grounded.

The grounded electrically conductive layer formed on the outer surface of the lamp body grounds and shields the electromagnetic noise produced by the discharge bulb, the lighting tube in the lighting circuit, and current supplying lead wires connected to the discharge bulb, thus eliminating the difficulty of electromagnetic noise leaking out of the lamp body.

Further in order to achieve the above object, in a motor vehicle headlamp employing a discharge bulb as its light source, the lamp body is made of a resin mixed with a copper inhibitor, and an electrically conductive film made of copper material formed on the outer and/or inner surface of the lamp body is electrically connected to a vehicle body. A protective film may be formed on the electrically conductive film made of copper material.

The electromagnetic waves generated by the discharge bulb are grounded through the electrically conductive film formed on the lamp body in such a manner as to surround the discharge bulb. The copper inhibitor contained in the lamp body suppresses the deterioration of the lamp body which otherwise may be caused due to the contact of the lamp body with the electrically conductive film of copper material.

Yet further in accordance with the invention, in a motor vehicle headlamp with a discharge bulb as a light source, a lighting-circuit-accommodating unit holding a discharge bulb lighting circuit in a casing is secured to the rear wall of a lamp body, and the casing of the lighting-circuit-accommodating unit and the lamp body have an electrically conducting function, with the electrically conductive parts thereof electrically connected to a ground terminal in the lighting circuit. As for the electrically conducting function, the lamp body and the casing of the lighting-circuit-accommodating unit are made of electrically conductive material, or the lamp body and the unit casing are made of electrically nonconductive material with an electrically conductive film formed on their surfaces.

DESCRIPTION OF THE PREFERRED EMBODIMENTS

Preferred embodiments of the invention will be described with reference to the accompanying drawings.

Figure 1:
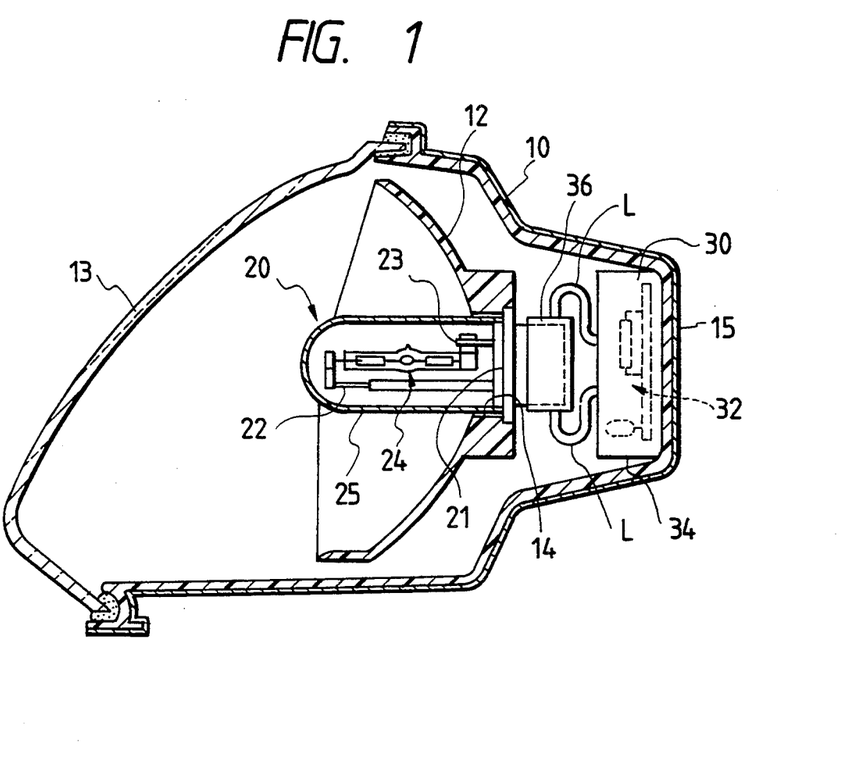
FIG. 1 is a longitudinal sectional view showing an example of a motor vehicle headlamp constructed in accordance with a first embodiment of the invention.
Figure 2:
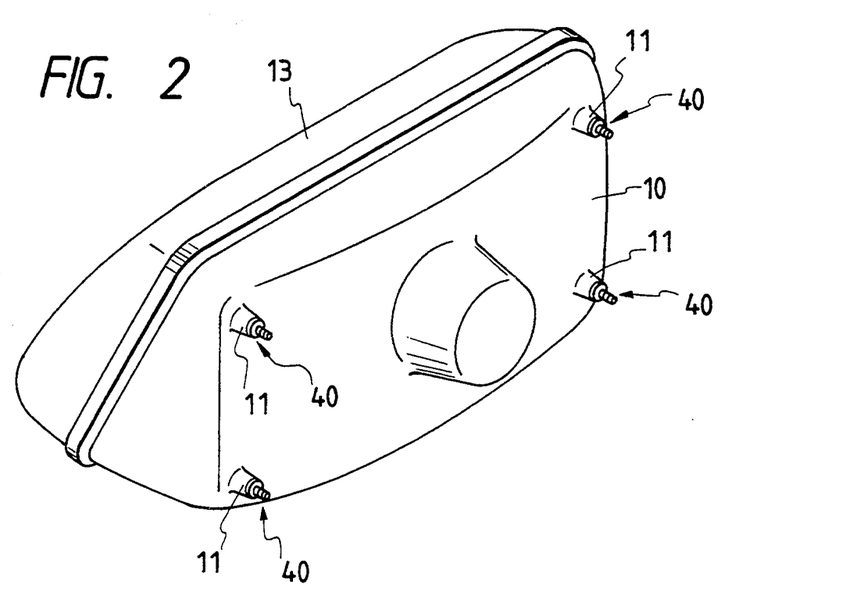
FIG. 2 is a perspective view of the headlamp of FIG. 1 as viewed from the rear.
Figure 3:
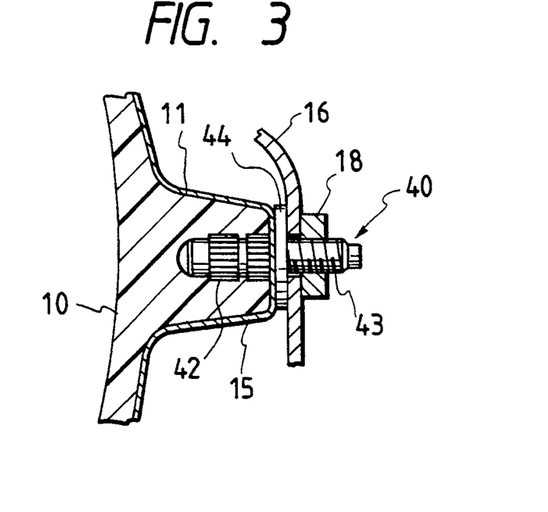
FIG. 3 is a longitudinal sectional view showing essential components of the headlamp of FIG. 1.

FIGS. 1 through 3 shows a first embodiment of the invention. More specifically, FIG. 1 is a longitudinal sectional view of a motor vehicle headlamp employing a discharge bulb as its light source, FIG. 2 is a perspective view of the headlamp as viewed from the rear, and FIG. 3 is a longitudinal sectional view showing a stud bolt and related components.

In these figures, reference numeral 10 designates a container-shaped lamp body. Inside the lamp body 10, a parabolic reflector 12 is tiltably supported by an aiming mechanism (not shown). A bulb inserting hole 14 is formed in the rear end portion of the reflector 12. A light source, namely, a discharge bulb 20, is inserted into the bulb inserting hole 14 thus formed.

The discharge bulb 20 includes an insulating base 21, a pair of long and short lead supports 22 and 23 embedded in the insulating base 21 and extending forwardly of the base 21, and a discharge lamp 24, both ends of which are supported by the lead supports 22 and 23. An ultraviolet-ray shielding globe 25 is fixedly mounted on the insulating base 21 in such a manner that it covers the discharge lamp 24. Reference numeral 13 designates a lens engaged with the front opening of the lamp body 10.

A unit 30 accommodating a lighting circuit for the discharge bulb is mounted behind the reflector 12 inside the lamp body 10. The lighting-circuit-accommodating unit 30 is composed of a casing 34 and the lighting circuit 32 mounted in the casing 34. The lighting circuit 32 produces a high voltage, which is applied to the discharge lamp to cause the latter to carry out a stable discharge operation.

In the lighting circuit 32, a lighting tube for high voltage application and a ballast for stable discharge are connected to a printed circuit board. A pair of lead wires L extending from the lighting circuit 32 are connected through a connector 36 to the discharge bulb 20.

An electrically conductive layer 15 of an electrically conductive material such as a Cu-series, Ni-series or Zn-series metallic material is formed on the outer surface of the lamp body 10 by an electrochemical deposition or metallicon treatment. The headlamp is secured to the vehicle body 16 with stud bolts 40 which protrude from four corners of the rear wall of the lamp body 10, and nuts 18 (see FIG. 3). The conductive layer 15 is electrically connected to the vehicle body through the stud bolts 40.

Each of the stud bolts 40 has a knurled portion 42 embedded in a boss 11 protruding from the lamp body, and a male-threaded portion 43 which extends rearward. Each stud bolt 40 has a flange 44 in surface contact with the end face of the boss 11. The electrically conductive layer 15 is electrically connected through the flange 44 to the stud bolts 40.

With the above-described construction, electromagnetic noise produced by the discharge bulb 20, the lighting circuit 32 or the wires L is led through the electrically conductive layer 15 and the stud bolts 40 to the vehicle body 16. Hence, such electromagnetic noise will not affect electrical circuits and devices such as the vehicle's radio. Even if some electromagnetic noise is produced around the headlamp, the noise is blocked by the conductive layer 15 formed on the outer surface of the lamp body, and hence such noise will not affect the lighting circuit 32 mounted inside the lamp body 10.

As is apparent from the above description, the headlamp of the invention is advantageous in that, since the stud bolts 40 which fixedly secure the headlamp to the vehicle body perform a grounding function, the headlamp is grounded merely by mounting it on the vehicle body; that is, it is unnecessary to additionally provide a member for grounding the electrically conductive layer 15.

Figure 4:
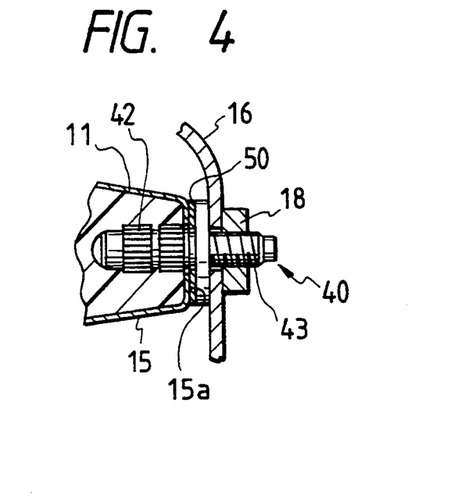
FIG. 4 is a longitudinal sectional view showing essential components of a second embodiment of a motor vehicle headlamp of the invention.
Figure 5A:
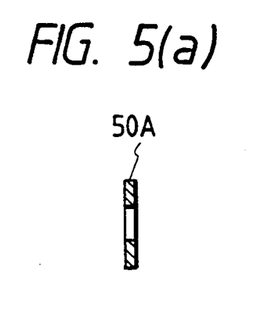
FIGS. 5(a)–5(c) are diagrams showing a variety of washers interposed between the end face of a boss and the flange of a stub bolt.
Figure 5B:
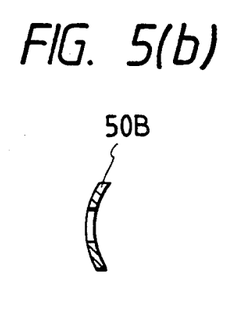
Figure 5C:
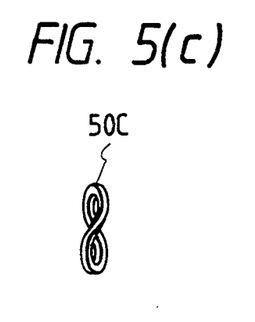
Figure 6:
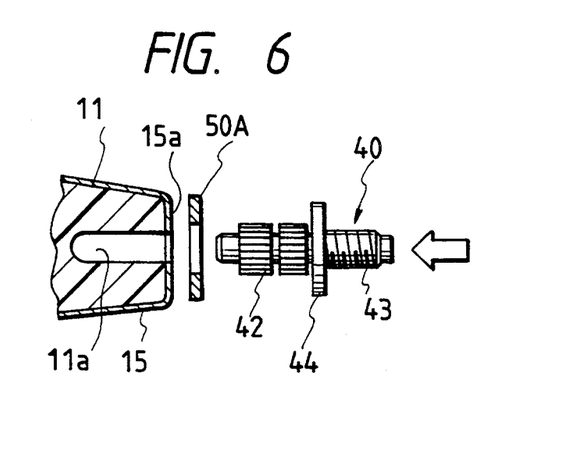
FIG. 6 is a diagram for a description of an operation of press-fitting a stud bolt.

FIGS. 4 through 6 show a second embodiment of the invention. More specifically, FIG. 4 is a longitudinal sectional view showing a stud bolt protruding from a motor vehicle headlamp and components in the vicinity thereof, FIGS. 5(a) through 5(c) are diagrams showing a variety of washers employed in the second embodiment, and FIG. 6 is an explanatory diagram for a description of a stud bolt press-fitting operation.

A specific feature of the second embodiment resides in that a washer 50 (50A, 50B or 50C) as shown in FIGS. 5(a) through 5(c) is interposed between the flange 44 of each of the stud bolts 40 and the end face of the respective boss 11. The washer 50 is considerably effective in preventing the electrically conducting layer 15a from coming off the end face of the boss when the stud bolt 40 is secured to the boss 11.

The stud bolt 40 is fixedly secured to the boss 11 by heating it and then press-fitting it into the hole 11a of the boss. If, in this case, no washer 50 is provided, as the bolt is press-fitted into the hole, the electrically conductive layer 15a on the end face of the boss tends to be deformed, broken, or scraped, as a result of which the electrical connection of the electrically conductive layer 15 to the flange 44 may be insufficient, and hence the electromagnetic noise shielding effect may be unsatisfactory. On the other hand, in the case where the stud bolt 40 is press-fitted into the hole 11a with the washer 50 placed on the end face of the boss as shown in FIG. 6, the electrical conductive layer 15a is prevented from being damaged, and accordingly it is positively electrically connected to the flange.

Examples of the washer 50 are as shown in FIGS. 5(a) through 5(c). FIG. 5(a) is a sectional view of a flat washer made of mesh metal, FIG. 5(b) is a sectional view of a conical spring washer, and FIG. 5(c) is a perspective view of a wavy washer.

Figure 7:
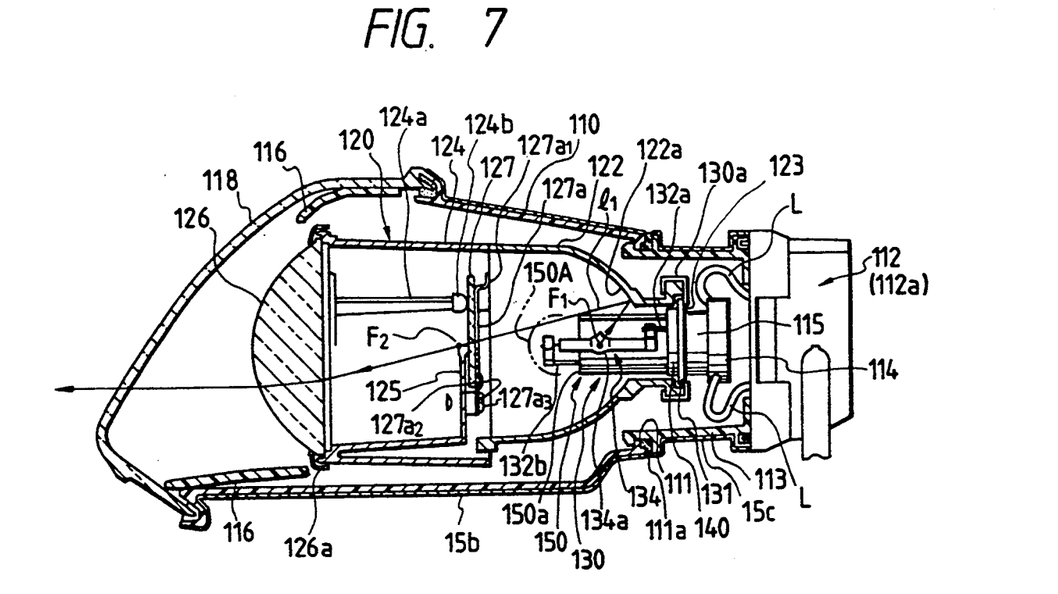
FIG. 7 is a longitudinal sectional view of a third embodiment of a motor vehicle headlamp of the invention.
Figure 8:
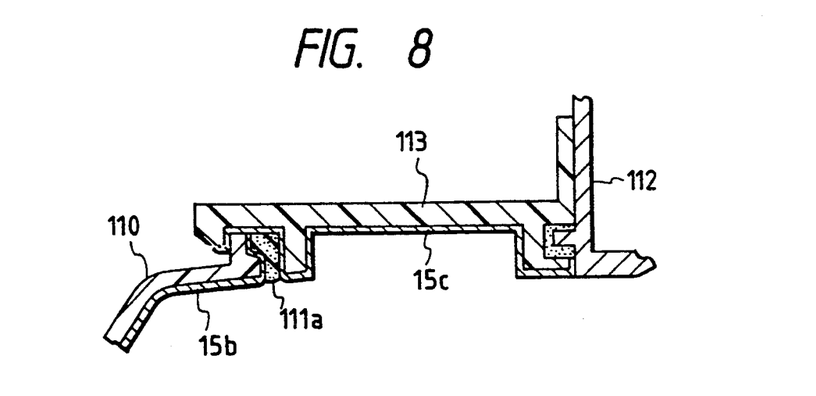
FIG. 8 is an enlarged sectional view of a part of the headlamp shown in FIG. 7.

FIGS. 7 and 8 show a third embodiment of the invention. More specifically, FIG. 7 is a longitudinal sectional view of a motor vehicle projection type headlamp employing a discharge bulb as its light source, and FIG. 8 is an enlarged diagram showing part of the headlamp.

In these figures, reference numeral 110 designates a container-shaped lamp body. An electrically conductive layer 15b is formed on the outer surface of the lamp body 110. Similarly as in the above-described first and second embodiments, the electrically conductive layer 15b is electrically connected to the vehicle body through stud bolts (not shown) which protrude from the rear wall of the lamp body 110.

Inside the lamp body 110, a light projection unit 120 is tiltably supported by an aiming mechanism (not shown). The light projection unit 120 includes a unitary ellipsoid metal reflector 122, a discharge bulb 130 inserted into a bulb inserting hole 123 formed in the rear end portion of the reflector, a metal lens holder 124 engaged with the front opening of the reflector 122, and a projection lens 126 engaged with the front opening of the lens holder 124. Reference numeral 130a designates a locking cap for fixing the discharge bulb 130 in the bulb inserting hole 123. Reference numeral 126a designates an annular lens-fixing frame for fixedly securing the projection lens 126 to the lens holder 124 by caulking.

The discharge bulb 130 includes a pair of lead supports 132a and 132b extending forwardly from an insulating base 131, and a discharge lamp 134 supported by the pair of lead supports 132a and 132b. The discharge section 134a of the discharge lamp 134 is disposed at the first focal point $F_1$ of the reflector 122. A cylindrical ultraviolet-ray shielding globe 150 is fixedly secured through a globe holding plate 140 to the front surface of the insulating base 131 in such a manner that the globe 150 surrounds the discharge lamp 134. Hence, of the rays emitted from the discharge section 134a, the ultraviolet rays of wavelengths hazardous to health are blocked by the ultraviolet-ray shielding globe 150.

A clear cut forming shade 125 integral with the lens holder 124 and an ultraviolet-ray shielding filter 127 fixedly secured to the lens holder 124 through a metal leaf spring member 127a are provided near the second focal point $F_2$ of the reflector 122. The light beam emitted by the discharge section 134, being reflected by the reflector 122, is converged at the second focal point $F_2$ of the reflector 122, and then converted into a parallel light beam by the projection lens 126 and projected forwardly.

The leaf spring member 127a is U-shaped, opening upwardly. The right and left end portions 127a₁ of the leaf spring member 127a are held between the lens holder 124 and the reflector 122, and the middle portion 127a₂ is secured to the shade 125 with a screw 127a₂. Reference numeral 124a designates a pair of right and left horizontal ribs foraged on the inner surface of the lens holder. One end portion of each of the ribs 124a on the side of the reflector is covered with a silicone rubber member 124b abutted against the filter 127. That is, the filter 127 is pushed against the silicone rubber members 124b and the upper end portion of the shade by the elastic force of the lead spring member 127a. The lens holder 124 and the leaf spring member 127a, which are made of metal, have a high degree of heat resistance.

The front end portion 150a of the ultraviolet-ray shielding globe 150 is positioned so that it does not block a light beam l₁ reflected from a hot-zone-forming light-reflecting surface 122a formed around the bulb inserting hole 123 of the reflector 122. In other words, the ultraviolet-ray shielding globe 150 is not positioned in the path of the light beam l₁ reflected from the reflector 122 to form the light distribution of the hot zone. In the case where the front end portion of the ultraviolet-ray shielding globe is closed (as indicated at 150A in FIG. 7), the light beam l₁ reflected by the reflector 122 is vignetted by the front end portion 150A, so that the hot zone may be insufficient in illuminance. On the other hand, in this embodiment, the light beam reflected from the light reflecting surface 122a of the reflector (which contributes to the light distribution in the hot zone) is not vignetted by the globe 150, and accordingly the hot zone is sufficient in light distribution. Thus, in this embodiment, the hot zone is suitable in size and sufficient in illuminance.

The ultraviolet-ray shielding globe 150 is cylindrical. The light emitted forwardly through the front opening of the globe includes ultraviolet rays of wavelengths hazardous to health. However, when the light passes through the ultraviolet-ray shielding filter 127 arranged near the second focal point $F_2$ of the reflector 122, the hazardous ultraviolet rays are cut off, and thus are prevented from causing a health hazard or adversely affecting nearby components of synthetic resin.

Reference numeral 112 designates a lighting-circuit-accommodating unit holding a discharge bulb lighting circuit (not shown). A cylindrical extension 113, which is a part of the lamp body, is connected through a gasket 111a to an opening 111 formed in the rear end portion of the lamp body 110. The lighting-circuit-accommodating unit 112 is secured to the cylindrical extension 113. The lighting-circuit-accommodating unit 112 has a unit casing 112a made of aluminum. Similarly as in the case of the cylindrical extension 113, the unit casing 112a is part of the lamp body. Lead wires L connected to the lighting circuit extend out of the unit casing 112a. A connector 114 is connected to a mating connector 115 formed on the rear side of the insulating base 131. Similarly as in the lamp body 110, an electrically conductive layer 15c is formed on the outer surface of the cylindrical extension 113. The gasket 111a held between the lamp body 110 and the cylindrical extension 113 is made of electrically conductive rubber or metal mesh rubber, so that the electrically conductive layers 15b and 15c are electrically connected to each other. Thus, the electrically conductive layers 15b and 15c and the aluminum unit casing 112, which surround the discharge bulb 130 and the discharge bulb lighting circuit, are electrically connected to the vehicle body through stud bolts (not shown). Hence, electromagnetic noise produced by the discharge bulb 130, the lighting circuit and the wires L is conducted to the body of the vehicle, and thus is prevented from interfering with other electrical devices or circuits.

Reference numeral 116 designates a decorative panel made of synthetic resin arranged around the projection lens 126 of the light projection unit 120. With the decorating panel 116, the headlamp has an improved appearance when turned off. Reference numeral 118 designates a lens engaged with the front opening of the lamp body 110.

As is apparent from the above description, in the motor vehicle headlamp of the invention, the grounded electrically conductive layer formed on the outer surface of the lamp body eliminates the difficulty of the electromagnetic noise produced by the discharge bulb and the lighting tube in the light circuit leaking out of the headlamp. Hence, electrical devices and circuits in the vicinity of the headlamp are free from interference by electromagnetic noise.

Figure 9:
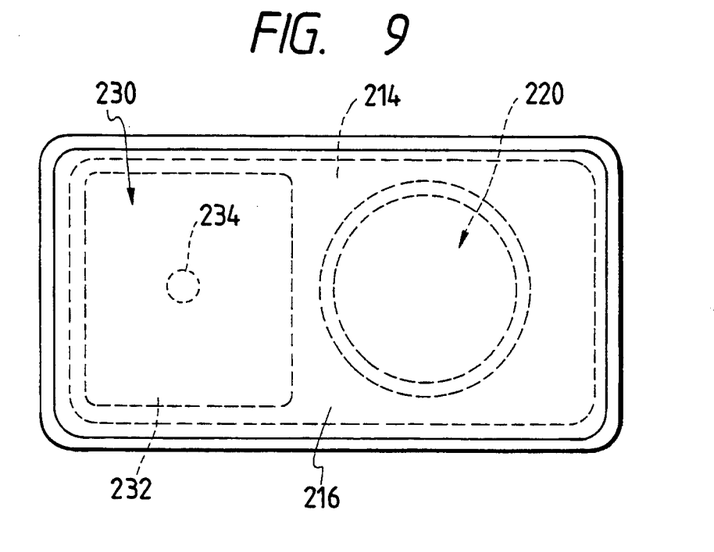
FIG. 9 is a front view showing an example of a motor vehicle headlamp constructed in accordance with a fourth embodiment of the invention.
Figure 10:
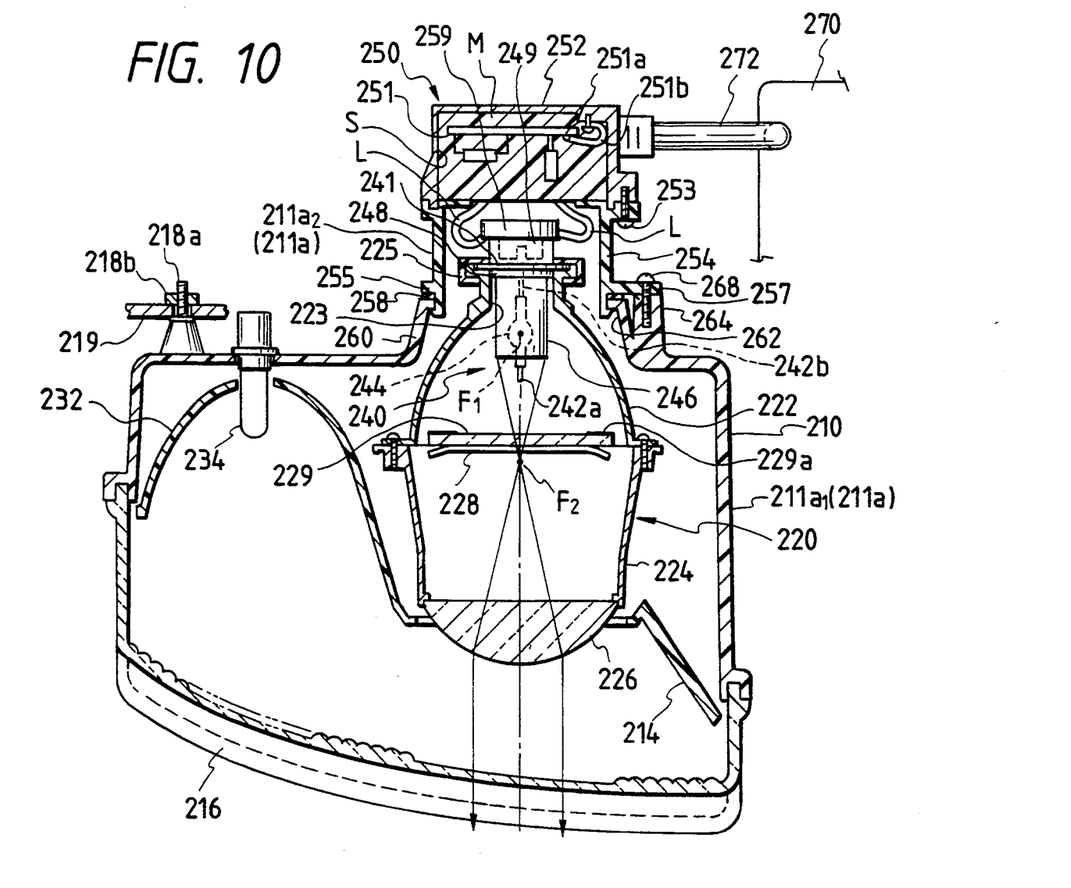
FIG. 10 is a horizontal sectional view of the headlamp of FIG. 9.
Figure 11:
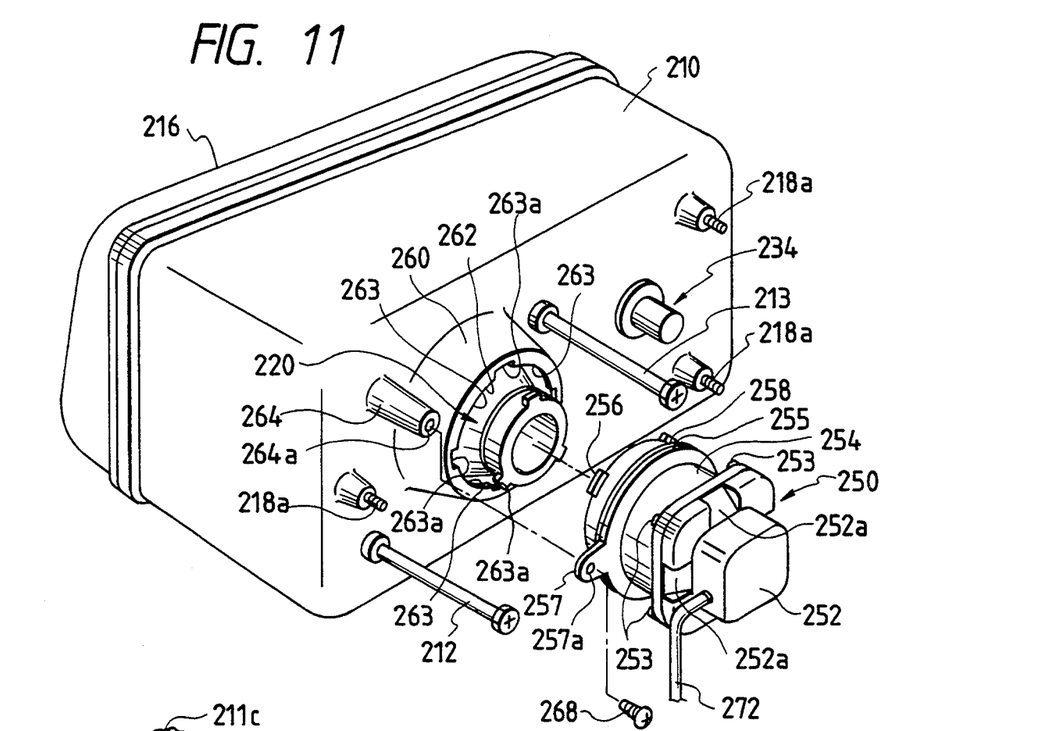
FIG. 11 is a perspective view of the headlamp of FIG. 9 as viewed from the rear.
Figure 12:
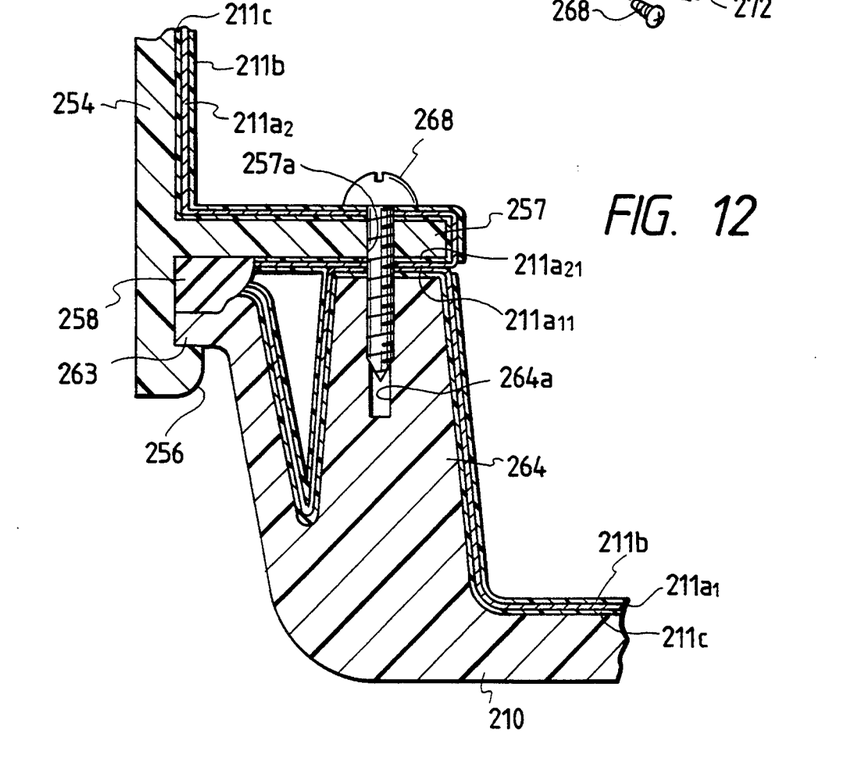
FIG. 12 is an enlarged sectional view showing the bayonet engagement of a lighting-circuit-accommodating unit and the opening of a lamp body.

FIGS. 9 through 12 show a fourth embodiment of the invention. More specifically, FIG. 9 is a front view of a motor vehicle headlamp with a clearance lamp, FIG. 10 is a horizontal sectional view of the headlamp, FIG. 11 is an exploded perspective view showing a lighting-circuit-accommodating unit and components in the vicinity thereof, and FIG. 12 is an enlarged sectional view showing the bayonet engagement of the lighting-circuit-accommodating unit with the opening of the lamp body.

In those figures, reference numeral 210 designates a container-shaped lamp body made of a synthetic resin. An electrically conductive layer 211a (211a$_1$) made of an electrically conductive Cu material is formed on the outer surface of the lamp body 210 by an electrodeposition technique or a metallicon treatment. The headlamp is secured to a vehicle body 219 with stud bolts 218a protruding from the rear wall of the lamp body 210, and nuts 218b (see FIG. 10). The electrically conductive layer 211a is electrically connected to the vehicle body 219 through the stud bolts 218a, which are electrically conductive being made of metal. The electrically conductive layer 211a$_1$ is, in addition, electrically connected to the vehicle body through a grounding terminal 251a provided in a lighting circuit 251 (described later). Thus, electromagnetic waves generated by the discharge bulb 240 are grounded through two electrically conductive paths.

In order to shield the electromagnetic waves generated by the discharge lamp (or metal halide lamp) of the discharge bulb 240 and to prevent the electrically conductive layer from peeling off, it is preferable that the electrically conductive layer 211a$_1$ be 40 to 80 μm in thickness.

If the lamp body were made of polypropylene, the material of the lamp body could deteriorate due to the contact with the electrically conductive layer 211a$_1$ of Cu material over long periods time. However, by forming the lamp body of polypropylene in which a copper inhibitor is dispersed, the lamp body scarcely deteriorates.

Further, an overcoat layer 211b of urethane material may be formed on the electrically conductive layer 211a$_1$ for protection of the layer 211a$_1$ (see FIG. 12). That is, if the electrically conductive layer 211a$_1$ made of copper material is exposed to the atmosphere, it may corrode when brought into contact with acid or salt. On the other hand, in this embodiment where the overcoat layer 211b is formed on the electrically conductive layer 211a$_1$ of copper material, the electrically conductive layer is preventing from corroding, even if its surface contacted by acid or salt.

In addition, in order to smooth the surface on which the electrically conductive layer 211a$_1$ is to be formed, and to enhance the adhesion of the electrically conductive layer 211a$_1$, an undercoat layer 211c of chlorine resin may be formed between the lamp-body-forming resin layer and the electrically conductive layer 211a$_1$.

The lamp body 210 together with a front lens 216 engaged with the front opening of the lamp body define a lamp chamber in which a light projection unit 220 for forming a low beam for the headlamp and a light bulb 234 for the clearance lamp are mounted. The light projection unit 220 is tiltably supported by an aiming mechanism formed by two aiming screws 212 and 213 supported on the rear side of the lamp body 210 in such a manner that they extend forwardly (see FIG. 11) and a ball joint (not shown) supported on the lamp body. Reference numeral 214 designates a cover made of synthetic resin which is engaged with the lamp body in such a manner that it surrounds the light projection unit 220. The surface of the cover 214 is formed as a mirrored surface by vacuum-deposition of aluminum. A reflector 232 for the clearance lamp 230 is provided beside the cover 214 in such a manner that the reflector and the cover form one unit. The bulb 234 for the clearance lamp, which has been inserted into the rear wall of the lamp body 210, extends forward through the reflector 232.

The light projection unit 220 includes a substantially ellipsoidal metal reflector 222, a discharge bulb 240 fitted in a bulb inserting hole 223 formed in the rear end portion of the reflector, and a metal lens holder 224 with the front opening of which a projection lens 226 is engaged and which is connected to the front opening of the reflector 222. The reflector, the discharge bulb, and the metal lens holder are provided as one unit. Reference numeral 225 designates a locking cap for fixedly holding the discharge bulb 240 in the bulb inserting hole 223.

In the discharge bulb 240, a discharge lamp 244 is supported by a pair of lead supports 242a and 242b which are embedded in an insulating base 241 in such a manner that they protrude forwardly. The discharge section of the discharge lamp 244 is at the first focal point F$_1$ of the reflector 222. A cylindrical ultraviolet-ray shielding globe 246 is fixedly secured to the front surface of the insulating base 241 through a ceramic disk 248 in such a manner that the globe 246 surrounds the discharge lamp 244. Hence, when light from the discharge section passes through the ultraviolet-ray shielding globe 246, ultraviolet rays of wavelengths hazardous to health are cut off. A clear-cutting shade 228 integral with the lens holder 224 and an ultraviolet-ray shielding filter 229 fixedly secured to the lens holder 224 with a metal leaf spring member 229a are provided near the second focal point F$_2$ of the reflector 222. The light from the discharge section of the discharge lamp 244 is reflected by the reflector 222, converged at the second focal point F$_2$ of the reflector 222, and then projected as a parallel light beam by the projection lens 226.

Reference numeral 250 designates a lighting-circuit-accommodating unit which holds a lighting circuit 251 for the discharge bulb in its casing. The unit 250 is mounted on the rear wall of the lamp body 210. The lighting circuit 251, which is adapted to apply high voltage between the electrodes of the discharge lamp 244 to cause the latter to perform a continuous and stable discharge operation, is accommodated in a lighting-circuit-accommodating chamber S formed in the casing 252 of aluminum. The lighting circuit 251 is made integral with the casing through resin molding M. The lighting circuit 251 formed on a printed circuit board is electrically connected to the vehicle body through a grounding circuit. In addition, the lighting circuit 251 is connected to a ballast circuit in a casing 270 provided below the headlamp through a connecting wire 272 extending from the lighting-circuit-accommodating unit 250, and it is connected to the discharge bulb 240 through lead wires L extending forwardly of the casing. Reference numeral 259 designates a female connector connected to the lead wires L. The female connector 259 is connected to a male connector 249 provided for the discharge bulb.

A cylindrical extension 254 made of the same material as the lamp body 210, i.e., polypropylene mixed with a copper inhibitor, is connected to the aluminum casing 252 of the lighting-circuit-accommodating unit 250 with screws 253. The cylindrical extension 254 is bayonet-engaged with a circular opening 262 formed in the rear wall of the lamp body 210, and is connected to the lamp body with a tapping screw 268. More specifically, the rear wall of the lamp body 210, which is located behind the discharge bulb 240, is formed into a cylindrical rear protrusion 260 in which the unit inserting circular opening 262 is formed. Three inward protrusions 263 and cuts 263a are alternately formed in the peripheral portion of the opening 262 at equal angular intervals. On the other hand, a flange 255, which is to be abutted against the periphery of the opening, and three outward protrusions 256, which are to be bayonet-engaged with the inward protrusions 263 of the opening, are formed on the outer wall of the front end portion of the cylindrical extension 254. With the outward protrusions 256 engaged with the cuts 263a, the lighting-circuit-accommodating unit 250 is turned clockwise. As a result, the outward protrusions 256 are engaged with the inward protrusions 263 in the axial direction of the headlamp, so that the cylindrical extension 254 is temporarily secured to the opening 262. An annular seal packing 258 is interposed between the outward protrusions 256 of the cylindrical extension 254 and the inward protrusions 263 of the opening so as to hermetically seal the components thus bayonet-engaged.

The unit casing 252, which is rectangular in shape, has recesses 252a in its outer wall so that it can be readily gripped with the hand. A boss 264 with a threaded hole 264a protrudes from the lamp body's rear wall near the cylindrical rear protrusion 260, while a plate-shaped protrusion 257 having a threaded hole 257a extends from the flange 255 of the cylindrical extension 254. When the unit 250 is bayonet-engaged with the opening 262, the plate-shaped protrusion 257 is abutted against the end face of the boss 264 with the threaded holes 264a and 257a in align/sent with each other. The tapping screw 268 is engaged with the threaded hole 257a, whereby the lighting-circuit-accommodating unit 250 is fixed in such a manner that it cannot turn in the direction of circumference of the circular opening 262.

Similarly as in the case of the lamp body 210, an electrically conductive layer $211a$ ($211a_2$) is formed through an undercoat layer 211c on the outer surface of the cylindrical extension 254, and an overcoat layer 211b is formed on the layer 211a. The electrically conductive layer $211a_2$ of the cylindrical extension is electrically connected to the electrically conductive layer $211a_1$ of the lamp body through the tapping screw 268. That is, as shown in FIG. 12, the overcoat layer 211b is formed on the outer surface of the lamp body except for the end face of the boss 264 provided for the plate-shaped protrusion 257, while the overcoat layer 211b is formed on the surface of the unit casing except the region corresponding to the end face of the boss. Thus, the electrically conductive layer $211a_{11}$ exposed on the end face of the boss 264 is pushed against the exposed electrically conductive layer $211a_{21}$ of the plate-shaped protrusion 257 with the tapping screw 268; that is, the two electrically conductive layers $211a_1$ and $211a_2$ are electrically connected to each other. In addition, the unit casing 252, which is made of an electrically conductive material such as aluminum, is electrically connected to the electrically conductive layer $211a_2$ of the cylindrical extension 254 through screws 253 which connect the casing 252 to the cylindrical extension 254. The unit casing 252 is connected through a wire 251b to the grounding terminal 251a of the ground circuit in the lighting circuit 251. Hence, the electrically conductive layers $211a_1$ and $211a_2$ and the aluminum unit casing 252, which surround the discharge bulb 240 and the discharge bulb lighting circuit 251, are electrically connected to the vehicle body through the grounding terminal 251a of the lighting circuit. Hence, electromagnetic waves generated by the discharge bulb 240, the lighting circuit 251 and the lead wires L are conducted through the unit casing 252 and the ground circuit to the vehicle body, and are thus prevented from affecting other electrical devices. In addition, the electrically conductive layers $211a_1$ and $211a_2$ and the unit casing 252 are electrically connected to the vehicle body through the stud bolts 218a. Therefore, even if the electrical path through the grounding terminal 251a of the lighting circuit is discontinued, the noise shielding effect is maintained by the electrical path extending through the stud bolts 218a.

In order to positively hermetically seal the bayonet-engaging region of the lighting-circuit-accommodating unit 250 and the opening 262 of the lamp body, the electrically conductive layers $211a_1$ and $211a_2$ should not be formed on the surfaces of the bayonet-engaging region which are brought into contact with the packing 258.

Figure 13:
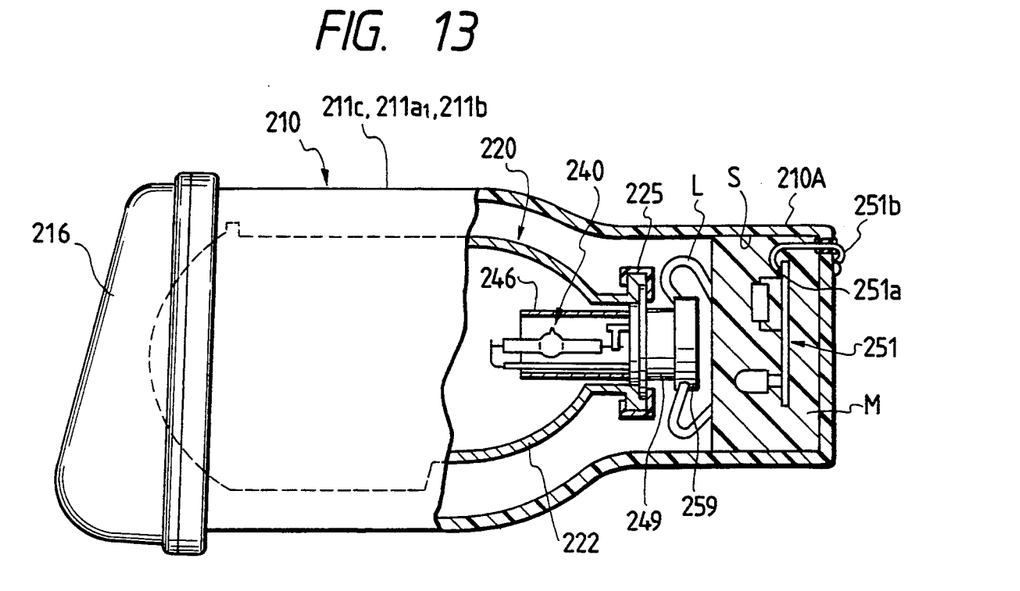
FIG. 13 is a longitudinal sectional view showing a motor vehicle headlamp of a fifth embodiment of the invention.
Figure 14:
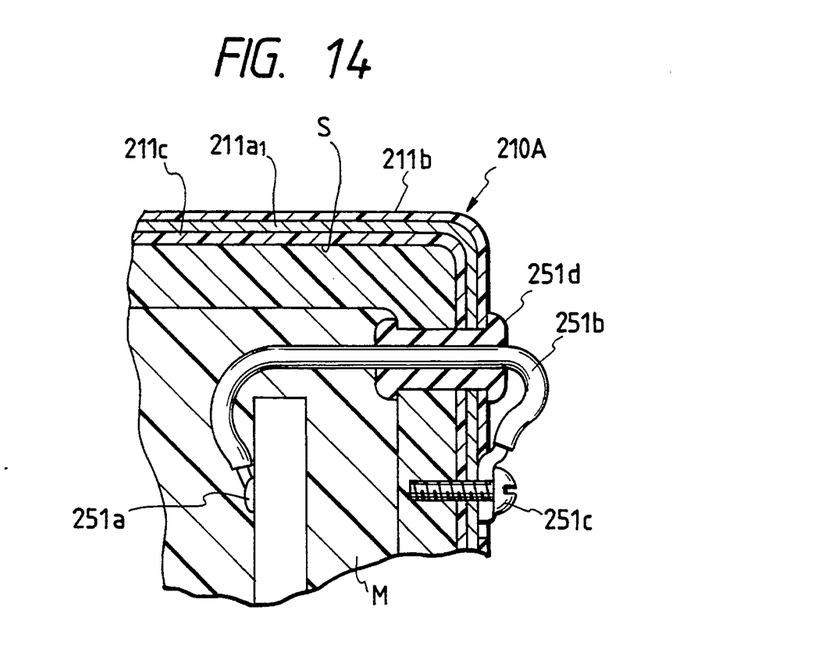
FIG. 14 is a sectional view showing the connection of an electrically conductive layer and an grounding terminal.

FIGS. 13 and 14 shows a fifth embodiment of the invention. In the above-described fourth embodiment, the separately provided lighting-circuit-accommodating unit 250 is connected to the rear wall of the lamp body 210. The fifth embodiment is different from the fourth embodiment in that the rear end portion of the lamp body 210 extends rearward into a rear extended portion 210A defining a lighting-circuit-accommodating chamber S in which the lighting circuit 251 is held with resin molded therein. Similarly as in the lamp body of the fourth embodiment, the lamp body is made of the polypropylene mixed with a copper inhibitor, an electrically conductive layer $211a_1$ is formed through an undercoat layer 211c on the outer surface of the lamp body, and an overcoat layer 211b is formed on the electrically conductive layer $211a_1$. As shown in FIG. 14, a wire 251b connected to the grounding terminal 251a extends out of the lamp body's rear extended portion 210A, and is connected to the electrically conductive layer $211a_1$ through a screw 251c. Reference character 251d designates a rubber bushing which closes the wire inserting hole.

In the above-described fourth and fifth embodiments of the invention, the electrically conductive layer is formed on the outer surface of the lamp body. However, the electrically conductive layer may be formed on the inner surface or both the inner and outer surfaces of the lamp body.

While the fourth and fifth embodiments of the invention have been described with reference to a projection type headlamp having a light projection unit for light distribution, it should be noted that the technical concept of the invention can be equally applied to a reflection type headlamp in which a parabolic reflector and the light distribution control step of a front lens are utilized for light distribution.

As is apparent from the above description, in the motor vehicle lamp body of the invention, the electromagnetic waves generated by the discharge bulb are grounded through the electrically conductive film formed on the lamp body. That is, when the discharge bulb is in operation, the electromagnetic waves generated inside the lamp body are prevented from leaking out of the lamp body. In addition, since the lamp body is made of a material containing a copper inhibitor, deterioration of the lamp body, which otherwise might be caused due to the contact of the lamp body with the electrically conductive film of copper material, is suppressed. Thus, the lamp body is excellent in durability.

Figure 15:
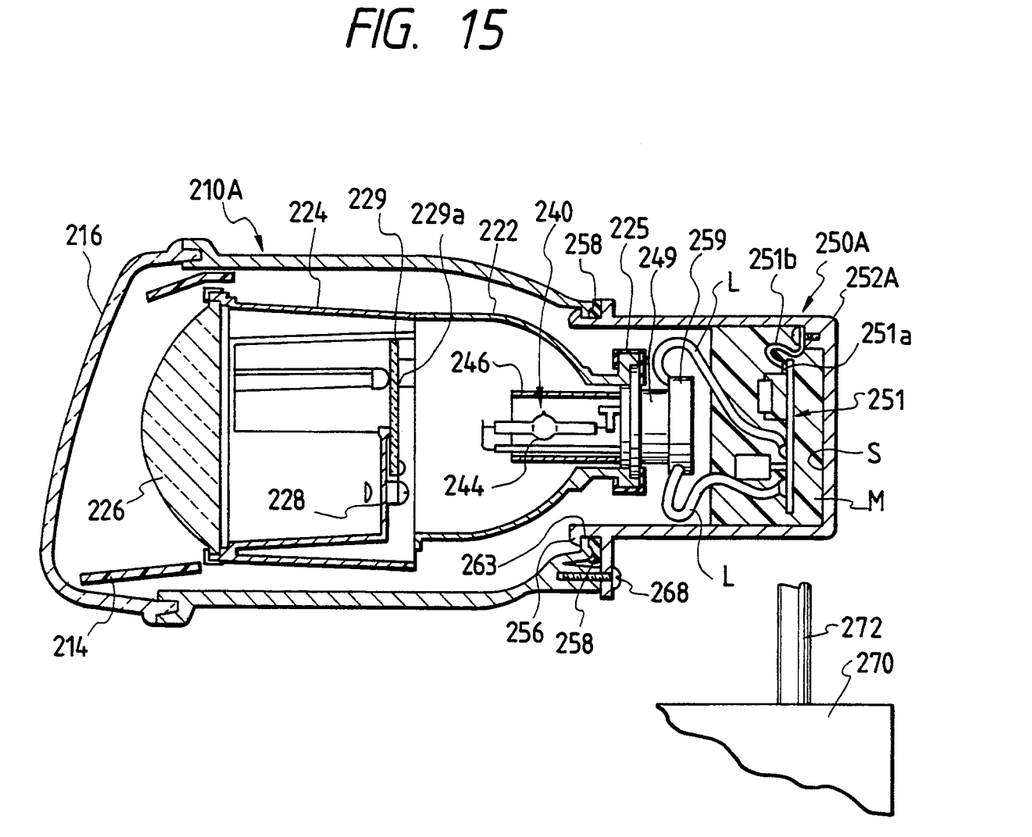
FIG. 15 is a longitudinal sectional view showing a motor vehicle headlamp of a sixth embodiment of the invention.

FIG. 15 is a longitudinal sectional view showing a sixth embodiment of the invention. In the sixth embodiment, the lamp body 210A is made of an electrically conductive resin, and the lighting-circuit-accommodating unit 250A is an aluminum die casting. That is, the lighting-circuit casing 252 and the cylindrical extension 254 are combined into a circuit casing 252A having a lighting-circuit accommodating chamber S. In the chamber S, the lighting circuit 251 is held with resin molded therein. The other components are the same as those in the third embodiment, and are therefore designated by the same reference numerals.

All three types of materials of the Cu-, Ni- and Zn-series can be used to form the electrically conductive layer for any of the embodiments of the invention.

What is claimed is:

1. A motor vehicle headlamp having a discharge lamp as a light source, comprising:
    an electrically conductive lamp body;
    a discharge bulb lighting circuit for producing a high voltage for continuously operating said discharge lamp, said discharge bulb lighting circuit being mounted within said electrically conductive lamp body, said discharge bulb lighting circuit comprising a ground terminal; and
    a conductor for connecting said ground terminal directly to said electrically conductive lamp body, wherein radiation of electromagnetic noise from said headlamp is prevented.

2. A motor vehicle headlamp having a discharge bulb as a light source, comprising:
    a lamp body formed of a resin material;
    an electrically conductive layer formed on said lamp body;
    a cylindrical extension made of the same material as said lamp body and having an electrically conductive layer formed thereon, said cylindrical extension being secured at one end to an opening in a rear portion of said lamp body with said electrically conductive layer on said lamp body being electrically connected to said electrically conductive layer on said cylindrical extension;
    a lighting circuit for producing a high voltage for continuously operating said discharge bulb; and
    a lighting-circuit-accommodating unit receiving said lighting circuit therein, said lighting-circuit-accommodating unit comprising a metal casing, said metal casing being secured to another end of said cylindrical extension and electrically connected to said electrically conductive layer on said cylindrical extension, wherein radiation of electromagnetic noise from said headlamp is prevented.

3. A motor vehicle headlamp having a discharge bulb as a light source, comprising:
    a lamp body formed of a resin material mixed with a copper inhibitor;
    an electrically conductive film of copper formed on said lamp body; and
    a lighting circuit for said discharge bulb attached to said lamp body.

4. The motor vehicle headlamp of claim 3, further comprising a protective film formed over said electrically conductive film.

5. The motor vehicle headlamp of claim 4, wherein said protective film is made of urethane.

6. The motor vehicle headlamp of claim 3, wherein a thickness of said electrically conductive film is in a range of 40 to 80 $\mu$m.

7. The motor vehicle headlamp of claim 3, wherein said resin material is a polypropylene.

8. The motor vehicle headlamp of claim 3, further comprising an undercoat layer between said electrically conductive film and said lamp body.

9. The motor vehicle headlamp of claim 8, wherein said undercoat layer is made of chlorine resin.

* * * * *